Figure 5:
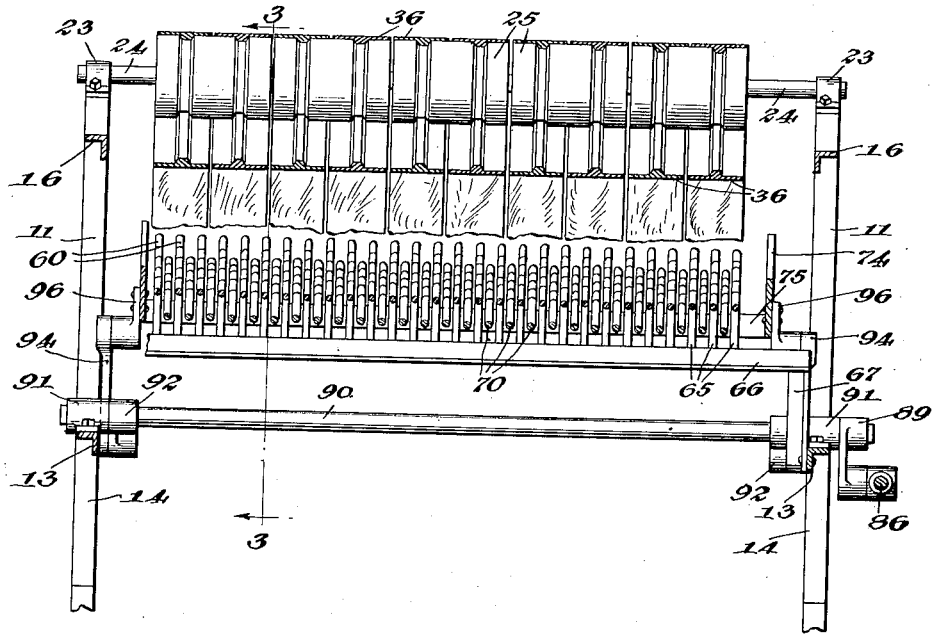

Oct. 29, 1935.  D. C. MORRIS ET AL  2,019,087
FRUIT DRIER
Filed June 19, 1934   3 Sheets-Sheet 1

Fig. 1.

Fig. 2.

WITNESSES

INVENTORS
D. C. Morris and
L. O. Cockrill,
BY
Munn, Anderson & Liddy
ATTORNEYS

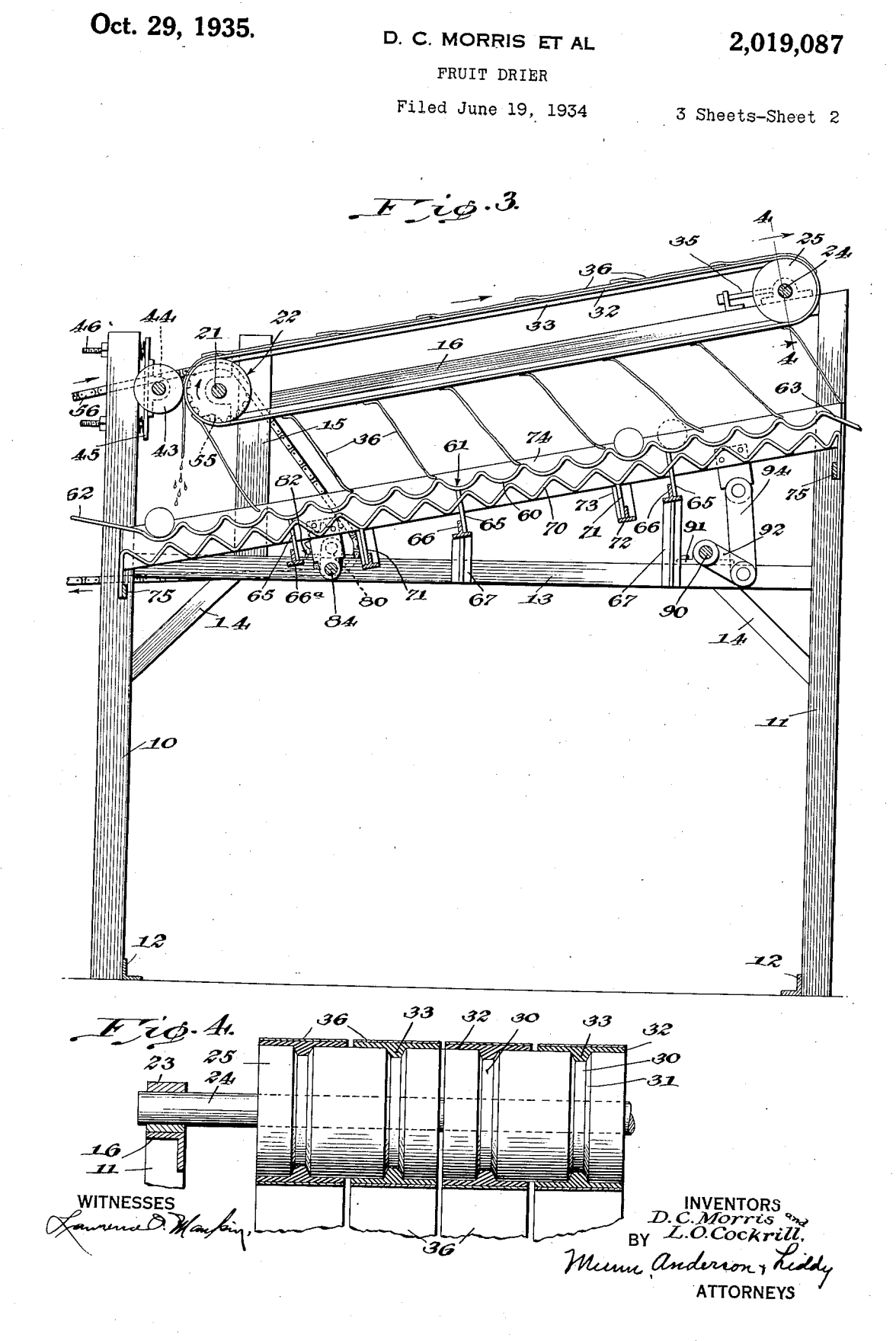

Oct. 29, 1935.   D. C. MORRIS ET AL   2,019,087
FRUIT DRIER
Filed June 19, 1934    3 Sheets-Sheet 2

Oct. 29, 1935.  D. C. MORRIS ET AL  2,019,087
FRUIT DRIER
Filed June 19, 1934   3 Sheets-Sheet 3

WITNESSES

INVENTORS
D. C. Morris and
BY L. O. Cockrill.
ATTORNEYS

Patented Oct. 29, 1935

2,019,087

UNITED STATES PATENT OFFICE 2,019,087

FRUIT DRIER

Douglas C. Morris and Leonard O. Cockrill, Yakima, Wash., assignors to Fruit Packers Supply and Equipment Company, Yakima, Wash., a corporation of Washington Application June 19, 1934, Serial No. 731,328

1 Claim. (Cl. 34—12)

This invention relates to fruit driers.

In the preparation of fresh fruits for shipment that have been sprayed with arsenic of lead or other insecticide it is not only customary but obligatory that such fruits be washed to reduce the residue of the spray to a predetermined degree as fixed from time to time by the pure food laws. Immediately after the fruit is washed it is ordinarily passed through a drying or wiping apparatus to remove sufficient moisture in order that it be possible for the fruit to pass to the sorters, then to the wrapping and packing department.

It has been proposed, after the fruit has been washed for removal of residue of the spray, to employ mechanical driers or wipers of different varieties. One of the most common types is an endless belt operating longitudinally of a conveyor which carries the fruit and having attached thereto a series of depending wiping members preferably formed of absorbent cloth. These wiping members are securely fastened to the endless belt and as the wiped fruit passes over the conveyor the moving belt drags the absorbent members over the fruit and then through a wringer roll at the end of the conveyor for removing excess moisture from the wiping members.

In the operation of the type of drier just described considerable difficulty is experienced in maintaining a carrier belt in its proper relation since as the wetting and drying of said belt causes it to creep on the pulleys over which it travels and the pressure of the wringer often times causes the belt to crawl and make its practical operation questionable.

It is an object of the present invention to provide a drying and wiping machine along the type just described in which the objectionable features outlined above have been eliminated.

Another object of the invention is the provision of a drying or wiping machine in which a belt carrying a plurality of absorbent wiping members are attached to a series of longitudinally disposed belts, co-operating means being formed on the belt and pulleys for preventing the belts from getting out of line or running off the pulleys.

A further object of the invention is the provision of a drying or wiping machine in which vision of a drying or wiping machine in which a plurality of belts are employed having depend a plurality of belts are employed having dependent wiping members attached thereto with the belts provided with internal annular ribs riding in complementarily formed grooves on the pulleys over which the belt operates.

Another object of the invention is the provision of a drying or wiping machine in which a plurality of belts carrying dependent absorbent members are adapted to move the absorbent members in a trailing fashion over fruit which is being conveyed beneath the absorbent members and revolved so that all of the moisture from the fruit will be taken up by the absorbing members.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claim.

In the drawings:

Figure 1 is a side view of a drier constructed in accordance with the principles of our invention, Figure 2 is a fragmentary transverse vertical section taken along the line 2—2 of Figure 1.

Figure 6:
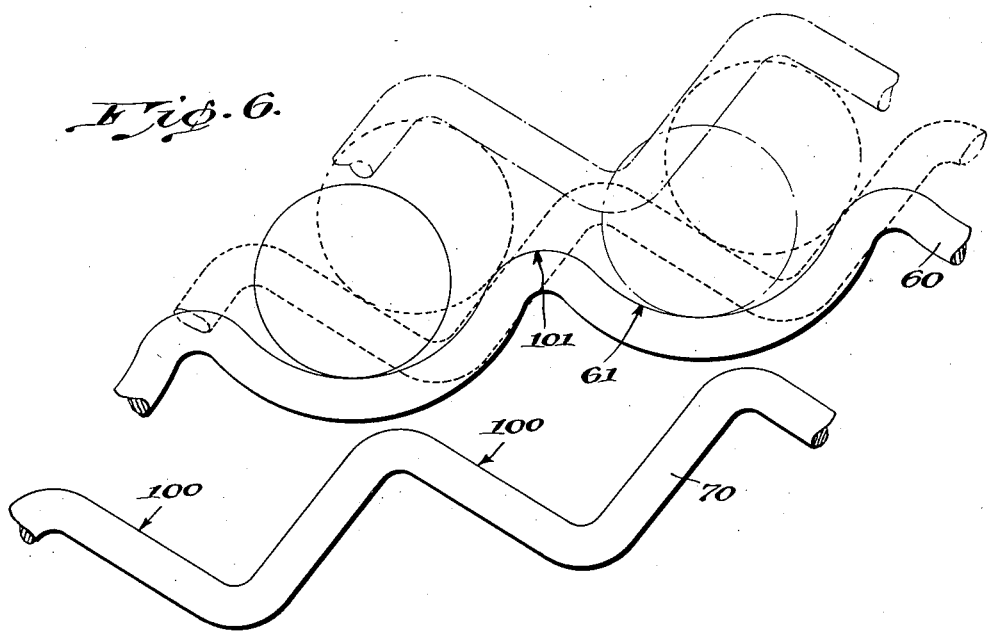

Figure 3 is a longitudinal vertical section taken along the line 3—3 of Figure 5, Figure 4 is a transverse vertical section taken along the line 4—4 of Figure 3, Figure 5 is a transverse vertical section taken along the line 5—5 of Figure 1, and Figure 6 shows more or less diagrammatically the conveyor elements in operation.

Referring more particularly to the drawings, 10 designates a pair of posts at one end of the machine while 11 designates a pair of posts at the opposite end. It will be noted that the posts 11 are of greater height than the posts 10 due to the fact that the drying mechanism is located at an angle to the vertical.

An angle iron 12 is disposed longitudinally of the machine and connects the pairs of posts together as shown in Figs. 1 and 3.

Horizontally disposed bars 13 connect the posts 10 and 11 together at opposite sides of the machine and at a predetermined height above the lower ends of the posts. Brace bars 14 connect the intermediate portions of the bars 13 with the posts 10 and 11.

Auxiliary posts 15 are connected at their lower ends to the bars 13 and are disposed in parallel relation with the posts 10. The upper end of each post 11 is connected with an auxiliary post 15 by means of an inclined bar 16 at each side of the machine.

Bearings 20 are rigidly secured to the upper ends of the posts 20 and carry a drive shaft 21. A pulley or drum 22 is rigidly connected with the shaft 21. A bearing 23 is mounted upon the outer or upper end of the inclined bar 16 and supports an axle 24 upon which is mounted a drum 25. Each of the rollers 25 and 22 are provided with a plurality of annular grooves 30. As shown in Fig. 4 the side walls of the grooves are beveled, as shown at 31. A plurality of belts 32 are trained on the pulleys and each belt at its inner face is provided with an annular rib 33 having the same cross sectional area as the grooves 30 so that these ribs will neatly fit within the grooves and prevent the belt from creeping or slipping. Thus it will be seen that the belts and pulleys are provided with co-operating means for guiding the belts in a direct longitudinal movement over the plurality of pulleys. The belts are rubber covered to prevent the absorption of moisture. An adjusting means of any well known type, as shown at 35, is provided on the side bars 16 and in connection with the bearings 23 for the shaft 24 which carries the idler pulleys 25. This means is adapted to tighten the belt when necessary.

At intervals along the outer surface of the belts 32 are secured a plurality of dependent members 36 which are formed of absorbent material and are adapted to be trailed over the fruit on a conveyor presently to be described for wiping the moisture from the washed fruit.

A wringer for the members 36 is closely associated with the driven drums or pulleys 22 for removing the moisture from the dependent members before said dependent members have been moved to an inoperative position at the upper portion of the moving belt as shown in Figs. 1 and 3. This wringer arrangement consists of a shaft 40 upon which is secured a metal sleeve 41 having end flanges 42. Embracing the sleeve 41 is a collar 43 formed of soft rubber which compresses against the dependent members for removing moisture. The opposite ends of the shaft 40 are mounted in bearings 44 which are secured to plates 45 and these plates are rigidly connected to spaced rods 46. The outer ends of these rods are threaded, as shown at 47, and upon which a nut 48 is screwed for maintaining the rods in position. A coil spring 49 embraces each rod and is located between a flange 50 of the post 10 and the inner face of the plate 45. The flanges 51 of the posts 10 are cut away as shown at 52 to provide openings for the springs 49. By this construction it will be seen that the wringer roller is resiliently mounted and will tend at all times to press against the dependent members 36 for removing moisture.

A sprocket wheel 55 is rigidly secured to one end of the shaft 21 and over this sprocket wheel is trained a chain 56. This chain is driven in any suitable manner by mechanism, not shown.

A conveying means is provided for moving the fruit beneath the traveling belt 32 and in substantial parallel relationship with the belt so that the free ends of the dependent absorbent members 36 will wipe the fruit while means is included in the conveyor for causing the fruit to be revolved so that all parts of the fruit will be wiped.

The conveyor includes thin strips of metal members 60 which are held stationary and are provided with curved pockets 61 arranged along the length of the conveyor for supporting fruit. The inner ends of the strips are provided with inclined members 62 to receive the fruit and guide it upon the first curved pocket 61. The opposite ends of these strips have inclined portions 61ᵃ to discharge the fruit from the conveyor.

A plurality of the spaced parallelly disposed strips 60 are supported at intervals by means of uprights 65 which have their upper ends secured to the strips 61 while the lower ends are supported by T-beams 66 disposed transversely and beneath the belt 36. Angle irons 66ᵃ are directly connected to the side bars 13 while the angle irons 66 are supported by legs 67 connected to the side bars 13.

Located at opposite sides of each of the strips 61 are a plurality of strips 70 connected at intervals to rods or bars 71. Angle irons 72 disposed in spaced relation with each other have legs 73 for connecting the same with movable side bars 74. The ends of the strips 70 are connected together by means of transverse bars 75.

A shaft 80 operates as a drive shaft since the chain 56 is trained over a sprocket 81 which is secured to the shaft 80. Said shaft is mounted in bearings 82 carried by the side bars 13. The shaft 80 has a crank 83 having a pin 84 at its outer end pivotally connected with a bar 85 secured to the side bar or plate 75 so that as the sprocket is revolved the inner end of the side bars 75 are moved through an arc of a circle.

A rod 86 is pivotally connected with one end of a crank 87 which is connected to the shaft 80. The other end of the rod is pivotally connected at 88 with the outer end of a link 89 rigidly secured to a pivoted shaft 90 mounted in bearings 91 carried by the rails or bars 13. A pair of cranks 92 are rigidly connected with the shaft 90 and have their outer ends pivotally connected at 93 with links 94. These links are pivotally connected at 95 with straps 96 secured to the side bars 75 of the conveyor. It will be noted that a duplicate arrangement of the operating means is located upon opposite sides of the drier.

The operation of my device is as follows: When power is applied to the chain 56 the sprockets 55 are revolved as are the sprockets 81. When the sprockets 85 are revolved the belts 32 are moved in the direction indicated by the arrow in Fig. 1. As this happens the dependent members 36 which are folded upon the upper portion of the traveling belts will fall when they pass beyond the post 25 so that the free ends will be in a position to wipe the fruit carried upon the conveyor.

The strips 60 having the curved pockets 61 remain stationary during the operation of the conveyor but the strips 70 are shifted through a movement substantially that of a parallelogram due to the operation of the rotation of the shaft 80 and the rocking of the shaft 90.

As shown more particularly in Fig. 6, the strips 70 are bent at right angles to form straight engaging portions 100 and these straight portions engage the fruit which are resting in the curved pockets 61 and move them upwardly and over the raised portions 101 of the stationary strips 60. The straight portions 100 move through vertical planes and are always inclined at an angle to the horizontal as indicated by the dotted line positions in Fig. 6. As the fruit is moved upwardly over the curved side edges of the pockets 61 it will be revolved continuously and also will be revolved when they pass the raised portions 101 of the stationary strips 60, whereby the fruit is being exposed at all points to the wiping action of the dependent members 36.

The oscillating movement of the strips 70 not only revolve the fruit but carry them continuously from one lower pocket to a higher pocket until they reach the outer ends whence they will be moved over the inclined portion 63 to a conveyor (not shown) to be carried to the sorters.

The movable portion being in the shape of a V will always place the objects or fruit ahead of the center of the arcs or curved portions 61 of the stationary members 60, thereby allowing the objects to roll back until they are centered in each pocket. This action provides a rolling and turning movement at each step along the conveyor to provide complete surface contact of the objects with the free ends of the dependent members 36.

As each of the dependent members 36 after having absorbed moisture from the fruits will pass between the rubber covering 43 of the wringer roller and the pulleys 22 whereby moisture which has been collected by the absorbent dependent members will be removed and they will be in a position when they again come in contact with the fruit to absorb moisture.

The ribs 33 on the belts will always maintain the belts in position and since these ribs are seated within the grooves 39 they will have no effect whatever upon the wringing action by the member 43.

We claim:

A fruit drier comprising a plurality of spaced inclined rods forming supports for fruit, each of said rods being bent at spaced distances along the lengths thereof to form curved pockets to support fruit individually, a movable rod between each support and bent to form substantially right angular V-shaped notches, means for shifting the rods so that one leg of each notch will cut across a plane which passes through the leg of an adjacently disposed curved pocket for lifting and rolling the fruit from a lower pocket to a succeeding higher pocket whereby the fruit is moved along the inclined rods while permitting free moisture on the fruit to be discharged by gravity between the rods, the other leg of each V-shaped notch moving substantially along a plane passing through the other leg of the curved pockets and cooperating with said leg for guiding the fruit in the next succeeding pocket, a plurality of spaced wipers, means for causing the wipers to be drawn over the moving fruit in a direction which is opposite to the direction of movement of the ascending fruit so that the free ends of the wipers when dragging over the fruit which is being moved up the inclined rods will aid in revolving said fruit while said wipers move down the inclined rods.

LEONARD O. COCKRILL.
DOUGLAS C. MORRIS.